United States Patent [19]
Gray et al.

[11] 3,788,664
[45] Jan. 29, 1974

[54] SHOULDER BELT STORAGE RETAINER
[75] Inventors: Thomas J. Gray, Warren; James H. DeClaire, Mt. Clemens; Herbert D. Tucker, Rochester, all of Mich.
[73] Assignee: General Motors Corporation, Detroit, Mich.
[22] Filed: June 5, 1972
[21] Appl. No.: 259,959

[52] U.S. Cl............................. 280/150 SB, 296/37 R
[51] Int. Cl.............................................. B60r 21/10
[58] Field of Search.............. 280/150 SB; 296/37 R

[56] References Cited
UNITED STATES PATENTS
| | | | |
|---|---|---|---|
| 3,532,361 | 10/1970 | Hrynik | 280/150 SB |
| 3,679,228 | 7/1972 | Settimi | 280/150 SB |
| 3,439,933 | 4/1969 | Jantzen | 280/150 SB |

*Primary Examiner*—Robert R. Song
*Attorney, Agent, or Firm*—Herbert Furman

[57] ABSTRACT

A shoulder belt storage retainer includes an elongated resilient member having a base portion attached to a vehicle body roof structure. The elongated resilient member defines in cooperation with the body roof trim a shoulder belt storage pocket. In one form, the base portion of the elongated resilient member has integral downward extending portions in which tabs are provided. The tabs are engaged by the conventional door opening garnish molding to attach the elongated resilient member to the roof structure. In another form, the base portion is screw attached to the roof structure. A keyhole-shaped slot in the rearward end of the elongated resilient member receives the headed stud of the shoulder belt latch member to store the latch member in the storage retainer.

6 Claims, 9 Drawing Figures

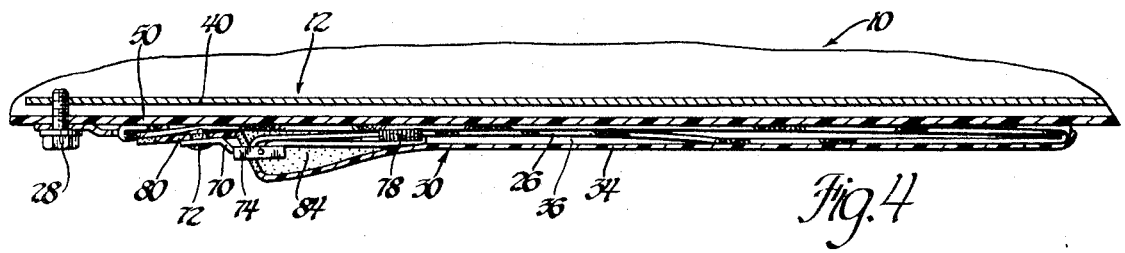
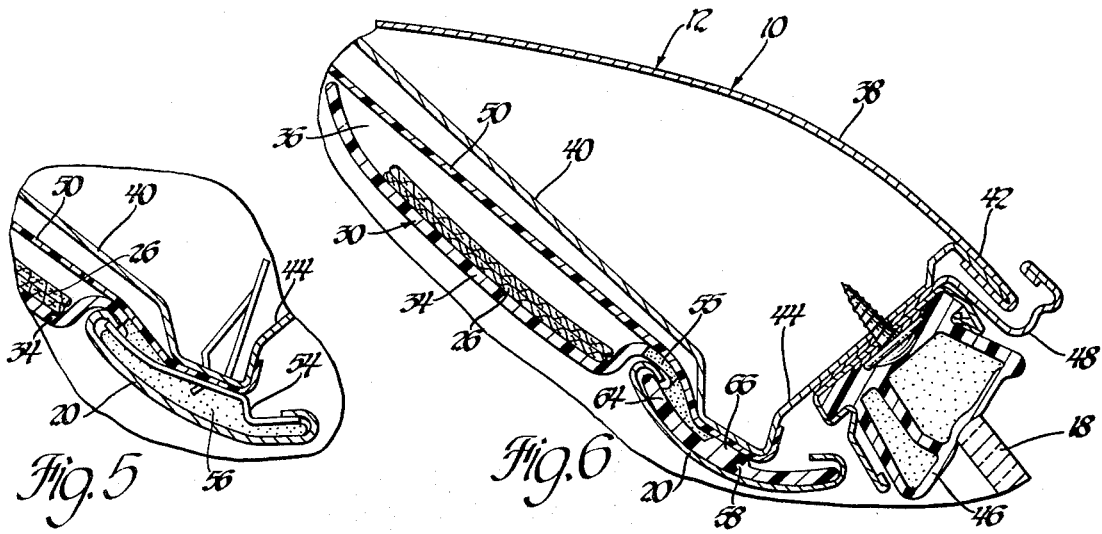
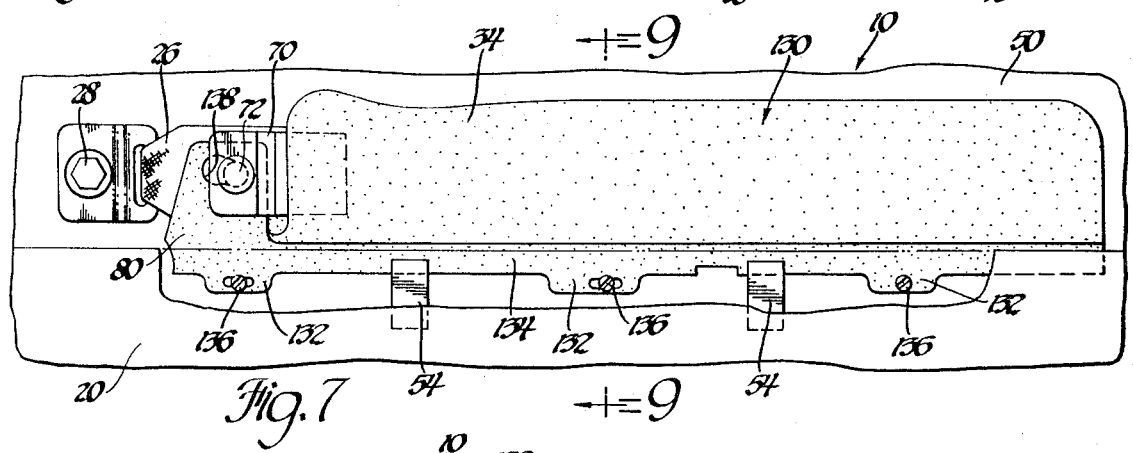
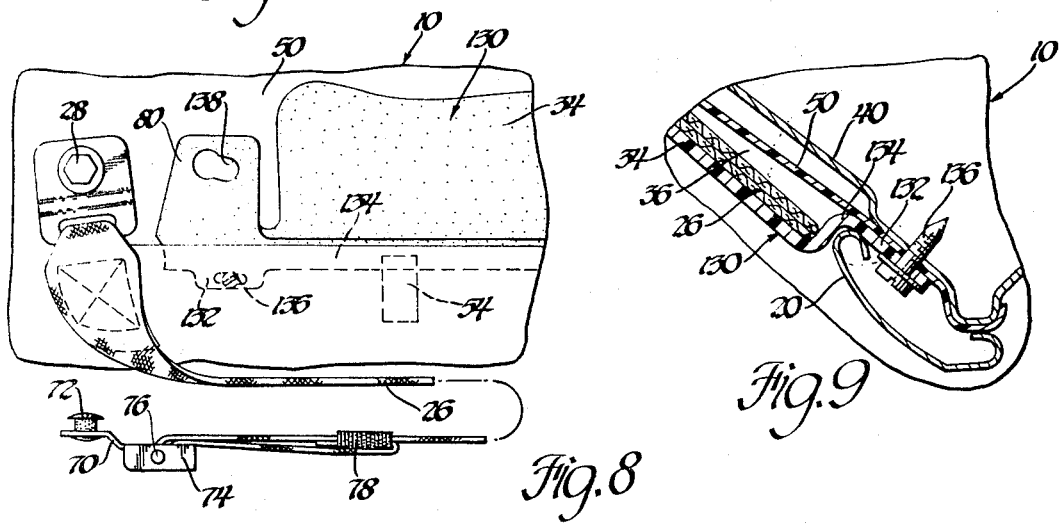

SHOULDER BELT STORAGE RETAINER

The invention relates to a shoulder belt storage retainer and more particularly to an elongated resilient member adapted for attachment to the vehicle roof structure to define therewith a pocket in which a folded shoulder belt may be stored.

Occupant restraining seat belt systems may include a shoulder belt anchored at one end to the vehicle roof structure outboard and rearwardly the seat occupant and having a latch member attached to the other end thereof. It is desirable in restraint systems employing shoulder belts to provide a device for storing the shoulder belt against the roof when not in use.

It is known to attach wire clips to the vehicle roof structure at longitudinally spaced intervals above the door opening for storing a folded shoulder belt.

It is also known to provide a belt reel attached to the vehicle roof structure to store the shoulder belt.

It is also known to mount a box-like container to the vehicle roof structure by the shoulder belt anchor member and to provide an aperture extending downwardly from the open top of the container to permit storage of the folded belt therein and extension of the belt from the container.

The storage retainer of the present invention includes an elongated resilient member which has a base portion attached to the vehicle roof structure and defines in cooperation with the body headliner or headlining a shoulder belt storage pocket. One end of the shoulder belt is anchored to the roof structure at a point rearwardly of the elongated resilient member. The storage retainer is particularly adapted for storage of a shoulder belt having a latch member including a headed stud. A keyhole-shaped slot or aperture in the rearward end of the elongated resilient member receives the headed stud to store the latch member. The elongated resilient member is of sufficient length and so located relative the shoulder belt anchor that the belt may be stowed in the storage retainer with a single fold.

In one embodiment of the invention, the base portion of the elongated resilient member has integrally molded downwardly extending portions in which tabs are provided. The tabs are engaged within the conventional door opening garnish molding to attach the elongated resilient member to the roof structure. In another embodiment of the invention, the base portion of the elongated resilient member is attached to the roof structure by screws. In either embodiment, the garnish molding conceals the attachment of the elongated resilient member to the roof structure to provide an attractive vehicle interior.

On feature of the present invention is the provision of an elongated resilient member attached to the roof inner panel of a vehicle body to define in cooperation with the roof trim a pocket in which a folded shoulder belt may be stored.

Another feature of the invention is the provision of a storage retainer having an aperture for storingly receiving the headed stud of a shoulder belt latch member.

A still further feature of the invention is the provision of an elongated shoulder belt storage retainer of such length as to receive therein the length of the shoulder belt with but a single fold therein.

Another feature of the invention is the provision of a shoulder belt storage retainer attached to the vehicle roof structure by a conventional garnish molding.

Another feature of the invention is the provision of a shoulder belt storage retainer located entirely forwardly of the seat belt anchorage so that the seat belt when in occupant use position is entirely free of interference with the storage retainer.

Other features and advantages of the present invention will become apparent upon consideration of the appended specification and drawings in which:

FIG. 4 is a section view taken in the direction of arrows 4—4 of FIG. 2;

FIG. 5 is a section view taken in the direction of arrows 5—5 of FIG. 2;

FIG. 6 is a section view taken in the direction of arrows 6—6 of FIG. 2;

FIG. 7 is a view similar to FIG. 2 of a second embodiment of the invention;

FIG. 8 is a fragmentary view of FIG. 7 showing the belt in unstored position; and FIG. 9 is a section view taken in the direction of arrows 9—9 of FIG. 7.

Figure 1:
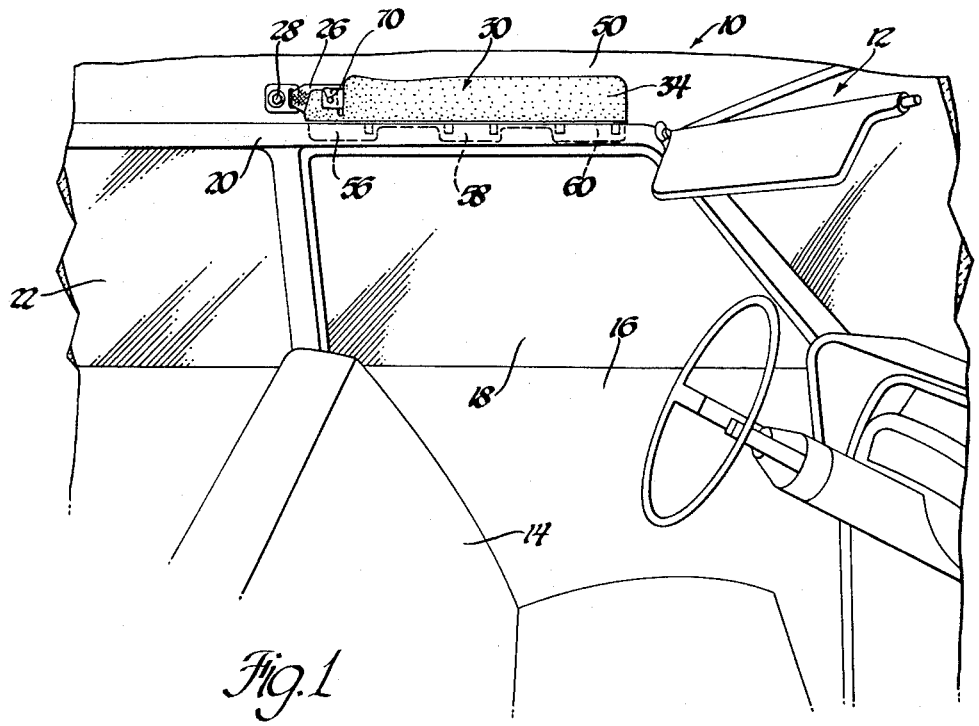
FIG. 1 is a perspective view of the interior of a passenger vehicle showing a shoulder belt storage retainer according to one embodiment of this invention showing the belt in stored position.

Referring now to FIG. 1, a vehicle body is generally indicated by 10 and includes a roof structure 12, a seat 14, and a door 16 having a window 18. A conventional garnish molding 20 is mounted to the roof structure 12 above the front window 18 and the rear window 22 as will be described hereinafter. The anchor plate of a driver shoulder belt 26 is secured to the vehicle roof structure by a bolt 28. A shoulder belt storage retainer indicated generally at 30 is attached to the vehicle roof structure 12 forming therewith a pocket in which the shoulder belt 26 is stored.

Referring to FIGS. 2 through 6, a first embodiment of the shoulder belt storage retainer 30 is shown. The storage retainer 30 is formed of resilient molded plastic and includes an elongated resilient member 34 which is attached to the roof structure 12 to define therewith a pocket 36 in which the folded shoulder belt 26 may be stored. Referring to FIG. 6, roof structure 12 includes a roof outer panel 38 and a roof inner panel 40 which are hem flanged together at 42. Panel 40 provides the door header 44. A weatherstrip 46 and drip rail 48 are conventionally attached to the door header. Window 18 engages weatherstrip 46 when door 16 is in closed position. The body headlining 50 is conventionally cemented at its side edge portion to the roof inner panel 40. For further disclosure of the roof structure, reference may be had to U.S. Pat. No. 3,635,519, Foster et al., issued Jan. 18, 1972 and assigned to the assignee of this invention.

The shoulder belt storage retainer 30 is attached to the vehicle roof structure 12 by the garnish molding 20 which is conventionally secured to panel 40 by spaced garnish molding clips 54, FIG. 5. The base portion 55 of the member 34 includes integral longitudinally spaced arcuate extensions or portions 56, 58, and 60. Each portion has at least one offset tab 64 molded therein. A rib 66 extends from the arcuate portion across the base or root of each tab as best seen in FIG. 6.

Figure 2:
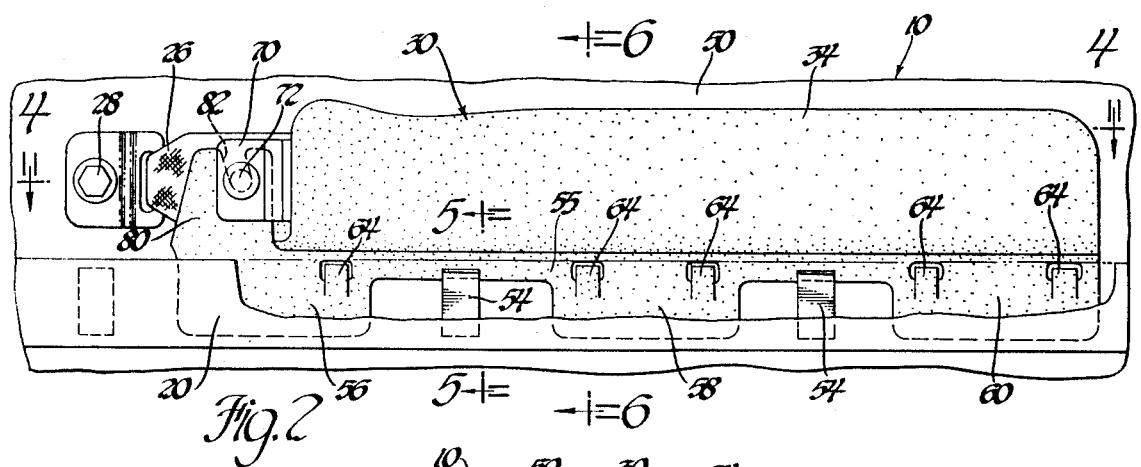
FIG. 2 is an enlarged view of a portion of FIG. 1.

As best shown in FIGS. 1, 2 and 6, the portions 56, 58 and 60 fit between the garnish molding 20 and the roof inner panel 40 intermediate the spaced garnish molding clips 54. The lower edges of the portions are received within the return bent lower edge of the garnish molding 20 while the tabs 64 are received within the upper return bent edge of the molding. The tabs and portions generally follow the contour of the garnish molding. The ribs 66 space the portions within the garnish molding and prevent withdrawal of the tabs and portions from within the molding.

The shoulder belt storage retainer 30 is attached to the roof structure by first aligning the retainer with the tabs 64 and bottom of the portions 56, 58, and 60 respectively aligned with the top and bottom of the garnish molding clips 54. The garnish molding 20 is then placed over the clips 54, tabs 64, and portions 56, 58, and 60 with the result that the garnish molding 20 is attached by the clips 54 to the roof inner panel 40 and the portions 56, 58, and 60 of the storage retainer 30 engaged within the garnish molding 20 and the ribs 66 engaged against the roof inner panel 40. Thus it may be seen that the storage device 30 is simply and attractively attached to the roof structure 12, thereby defining shoulder belt storage pocket 36 between the elongated resilient member 34 and the headlining 50.

Figure 3:
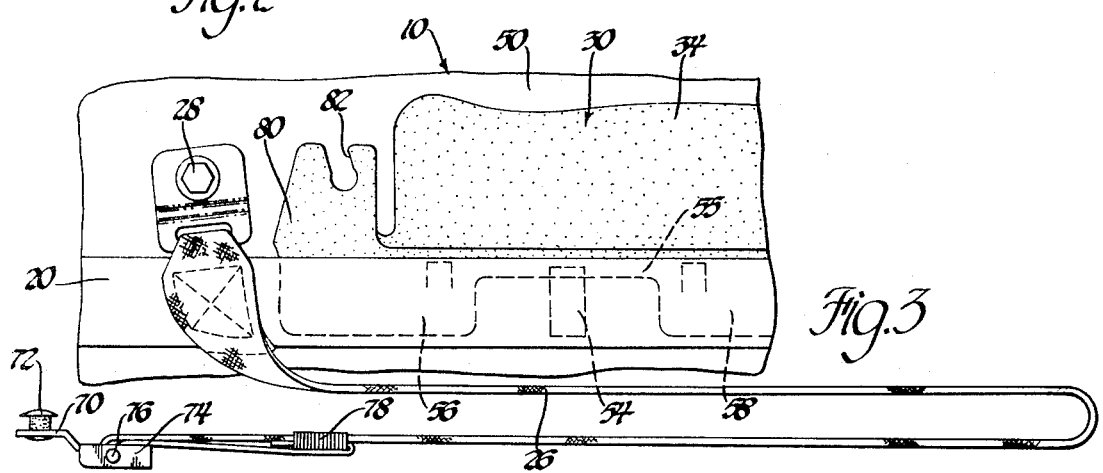
FIG. 3 is a fragmentary view of FIG. 2 showing the shoulder belt out of the storage retainer.

The seat belt storage retainer 30 is particularly adapted for storage of a shoulder belt of the type having a latch member including a headed stud which is engageable in a keyhole aperture in a passenger restraining lap belt arrangement. As best shown in FIG. 3, the latch member includes a plate 70 having attached thereto a headed stud 72. Attached to plate 70 is a housing 74 in which a knurled bar 76 is slidably journaled. The shoulder belt 26 passes through the housing 74 about knurled bar 76 and terminates at a slack adjuster 78 which slidably engages belt 26. The knurled bar 76 permits adjustment of the length of belt 26 and the slack adjuster 78 permits adjustment for the resultant slack.

An upwardly extending portion 80 of the shoulder belt storage retainer 30 is molded integrally with the elongated resilient member 34 at its rearward end and has therein a keyhole-shaped open slot 82 which receives the headed stud 72 as shown in FIG. 2 to store the latch member. As best seen in FIG. 4 the elongated resilient member 34 is molded at its rearward end to extend inwardly of the vehicle and thereby provide a pocket 84 of increased depth which receives the housing 74 of the shoulder belt latch member.

As best seen in FIG. 4, the shoulder belt 26 when stored in the storage device 30 has its portion nearest the bolt 28 passing behind the latch member retaining portion 80. It is noted that the elongated resilient member 34 is of sufficient length and is so located relative the anchor bolt 28 that the shoulder belt 26 is stored in the storage device 30 with but a single fold. Thus it is apparent that the shoulder belt may be quickly and simply placed in the retainer by the vehicle passenger without the necessity of making many folds in the length of the belt. Referring to FIG. 3 it is seen that the volt 28 is located rearwardly of the storage retainer 30 so that when the shoulder belt 26 is in passenger use position it is free from interference with storage retainer 30.

With reference now to the second embodiment of the invention shown in FIGS. 7, 8, and 9, the storage retainer 130 is similar in shape and function to the storage retainer 30 of the first embodiment, and accordingly like elements of the second embodiment are referred to by like reference numerals. In this embodiment of the invention, slotted extensions or portions 132 of the base portion 134 of the storage retainer 130 are attached to the roof inner panel 40 by screws 136. The portions 132 are located intermediate the clips 54 and are covered by the garnish molding 20 thereby providing an attractive attachment arrangement. The latch member storage feature is provided by a keyhole-shaped closed slot 138 which receives headed stud 72.

Thus it is seen that the invention provides an effective and attractive shoulder belt storage retainer.

What is claimed is:

1. In combination with a vehicle body having a roof structure, a shoulder belt anchored at one end to the roof structure and having a latch member at the other end thereof, a garnish molding, and spaced means attaching the garnish molding to the roof structure, a shoulder belt storage retainer comprising an elongated resilient member, and means intermediate the garnish molding and the roof structure and intermediate the spaced means for mounting the elongated resilient member to the roof structure, the longated resilient member defining in cooperation with the roof structure a pocket for receiving and storing the shoulder belt.

2. The combination of claim 1 further including means on the elongated resilient member for releasably securing the shoulder belt latch member thereto.

3. In combination with a vehicle body having a roof structure, a restraining shoulder belt anchored at one end to the roof structure and having a latch member at the other end thereof, a garnish molding, and a plurality of spaced means for attaching the garnish molding to the body, a shoulder belt storage device comprising, an elongated resilient member having a plurality of longitudinally spaced portions extending downwardly between the spaced means, tab means on each of the longitudinally spaced portions engaged within the garnish molding to mount the elongated resilient member on the vehicle body roof structure, the elongated resilient member when mounted on the vehicle body roof structure cooperating therewith to define a pocket in which the folded shoulder belt may be stored.

4. A storage retainer forming a pocket in cooperation with a vehicle roof structure for storing a shoulder belt having a latch member, said storage retainer comprising: an elongated resilient member having a base portion, attachment means on the base portion for attaching the base portion to the vehicle roof structure, a first portion of the elongated resilient member being formed to be spaced from the roof structure to provide in cooperation with the roof structure a first pocket for receiving the belt, a second portion of the elongated resilient member being formed to be spaced a greater distance from the roof structure than the first portion to provide in cooperation with the roof structure a second pocket for receiving and storing the latch member.

5. The combination of claim 4 wherein the shoulder belt latch member has a headed stud and the elongated resilient member includes slot means for receiving the headed stud of the latch member to secure the latch member to the storage retainer.

6. A storage retainer forming a pocket in cooperation with a vehicle roof structure for storing a shoulder belt including a latch member having a headed stud, said storage retainer comprising: an elongated resilient member having a base portion, attachment means on the base portion for attaching the base portion to the roof structure, the elongated resilient member having slot means engageable by the headed stud of the shoulder belt latch member for retaining the latch member in the storage retainer, the elongated resilient member having a first portion formed to be spaced a distance from the roof structure to provide a first pocket for receiving the folded shoulder belt and a second portion intermediate the first portion and the slot means, the second portion being formed to be spaced a greater distance from the roof structure than the first portion to provide a second pocket for receiving and storing the latch member.

* * * * *